(12) United States Patent
Hansson

(10) Patent No.: US 9,066,135 B2
(45) Date of Patent: Jun. 23, 2015

(54) SYSTEM AND METHOD FOR GENERATING A SECOND SCREEN EXPERIENCE USING VIDEO SUBTITLE DATA

(71) Applicant: Sony Mobile Communications AB, Lund (SE)

(72) Inventor: Emil Hansson, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 59 days.

(21) Appl. No.: 13/744,803

(22) Filed: Jan. 18, 2013

(65) Prior Publication Data
US 2014/0173647 A1  Jun. 19, 2014

Related U.S. Application Data

(60) Provisional application No. 61/738,544, filed on Dec. 18, 2012.

(51) Int. Cl.
*H04N 21/44* (2011.01)
*G06F 17/30* (2006.01)
*H04N 21/462* (2011.01)
*H04N 21/4722* (2011.01)

(52) U.S. Cl.
CPC .... *H04N 21/44008* (2013.01); *G06F 17/30997* (2013.01); *H04N 21/4622* (2013.01); *H04N 21/4722* (2013.01); *G06F 17/30796* (2013.01)

(58) Field of Classification Search
CPC .......... H04N 21/44008; H04N 21/812; H04N 21/4331; H04N 21/43615
USPC ........... 725/10, 13, 14, 19, 22–25, 32, 37, 62, 725/63, 73, 74, 86, 135, 143
See application file for complete search history.

(56) References Cited

U.S. PATENT DOCUMENTS

| 8,397,263 | B2 * | 3/2013 | Takagi | 725/58 |
| 2008/0208839 | A1 | 8/2008 | Sheshagiri et al. | |
| 2008/0266449 | A1 | 10/2008 | Rathod et al. | |
| 2012/0233155 | A1 | 9/2012 | Gallmeier et al. | |
| 2012/0291072 | A1 * | 11/2012 | Maddison et al. | 725/53 |
| 2014/0173653 | A1 * | 6/2014 | Waibel et al. | 725/34 |

FOREIGN PATENT DOCUMENTS

CN  101546587  9/2009

OTHER PUBLICATIONS

International Search Report and Written Opinion from corresponding International Application No. PCT/IB2013/060756, mailed on Mar. 12, 2014.

* cited by examiner

*Primary Examiner* — Jivka Rabovianski
(74) *Attorney, Agent, or Firm* — Renner, Otto, Boisselle & Sklar, LLP.

(57) ABSTRACT

Second screen content for a display of an electronic device is generated and displayed in coordination with video content displayed on a display of another electronic device. The generation of the second screen content includes identifying keywords from subtitle data for the video content and identifying links to media content that relate to one or more of the keywords.

18 Claims, 2 Drawing Sheets

SYSTEM AND METHOD FOR GENERATING A SECOND SCREEN EXPERIENCE USING VIDEO SUBTITLE DATA

RELATED APPLICATION DATA

This application claims the benefit of U.S. Provisional Patent Application No. 61/738,544, filed Dec. 18, 2012, the disclosure of which is incorporated herein by reference in its entirety.

TECHNICAL FIELD OF THE INVENTION

The technology of the present disclosure relates generally to electronic devices and, more particularly, to a system and method in which a user is presented with video content on a first electronic device and information about the video content on a second electronic device, the second electronic device acting as a so-called second screen.

BACKGROUND

Electronic devices, and particularly portable electronic devices such as mobile telephones and tablet computing devices, are becoming increasingly popular. Many television watchers use an electronic device while separately watching video content on the television. If the video content that the user is watching on the television is known, then secondary content related to the video content may be displayed to the user on the electronic device. In this case, the electronic device is sometime referred to as a "second screen." The secondary content may include advertisements, product promotions, voting or polling interfaces to seek feedback from the user, sporting event statistics, etc.

But determining the video content that the user is watching on the television remains a challenge. Even more challenging is determining the portion of the video content that the user is observing at a given point in time and determining relevant secondary content that has some logical relationship to the video content.

SUMMARY

To enhance the viewing experience for video content, the present disclosure describes techniques for using subtitle data for displayed video content to generate content for a second screen.

According to one aspect of the disclosure, a method of generating content for a display of an electronic device, the content coordinating with video content displayed on a display of another electronic device, includes identifying keywords from subtitle data for the video content; identifying links to media content that relates to one or more of the keywords; and outputting at least one of the links or the media content for display on the display of the electronic device as second screen content.

According to one embodiment of the method, the display of second screen content is in coordination with the display of the video content on the another electronic device.

According to one embodiment of the method, the identifying keywords includes eliminating words from the subtitle data that are at least one of common words or belonging to a predetermined part of speech.

According to one embodiment of the method, the identifying keywords includes determining that each keyword matches a respective word in a keyword library.

According to one embodiment, the method further includes ranking the keywords by frequency of occurrence in the subtitle data.

According to one embodiment, the method further includes increasing the rank of a keyword that matches a word in metadata for the video content.

According to one embodiment, the method further includes decreasing the rank of a keyword that matches a character name present in metadata for the video content.

According to one embodiment of the method, the link for at least one of the keywords is predetermined.

According to one embodiment of the method, the link for at least one of the keywords is identified by conducting an Internet search using the at least one of the keywords.

According to another aspect of the disclosure, a system for generating content for a display of an electronic device, the content coordinating with video content displayed on a display of another electronic device, includes a communication interface operatively connected to receive subtitle data for the video content from a video data source; and a processing device that executes logical instructions to: identify keywords from the subtitle data for the video content; identify links to media content that relates to one or more of the keywords; and output at least one of the links or the media content for display on the display of the electronic device as second screen content According to one embodiment of the system, the display of second screen content is in coordination with the display of the video content on the another electronic device.

According to one embodiment of the system, the identification of keywords includes elimination of words from the subtitle data that are at least one of common words or belonging to a predetermined part of speech.

According to one embodiment of the system, the identification of keywords includes determination that each keyword matches a respective word in a keyword library.

According to one embodiment of the system, the keywords are ranked by frequency of occurrence in the subtitle data.

According to one embodiment of the system, the rank of a keyword that matches a word in metadata for the video content is increased.

According to one embodiment of the system, the rank of a keyword that matches a character name present in metadata for the video content is decreased.

According to one embodiment of the system, the link for at least one of the keywords is predetermined.

According to one embodiment of the system, the link for at least one of the keywords is identified by conducting an Internet search using the at least one of the keywords.

According to another aspect of the disclosure, a method of generating content for a display of an electronic device, the content coordinating with audio content, includes identifying keywords from lyric data for the audio content; identifying links to media content that relates to one or more of the keywords; and outputting at least one of the links or the media content for display on the display of the electronic device.

DETAILED DESCRIPTION OF EMBODIMENTS

Figure 1:
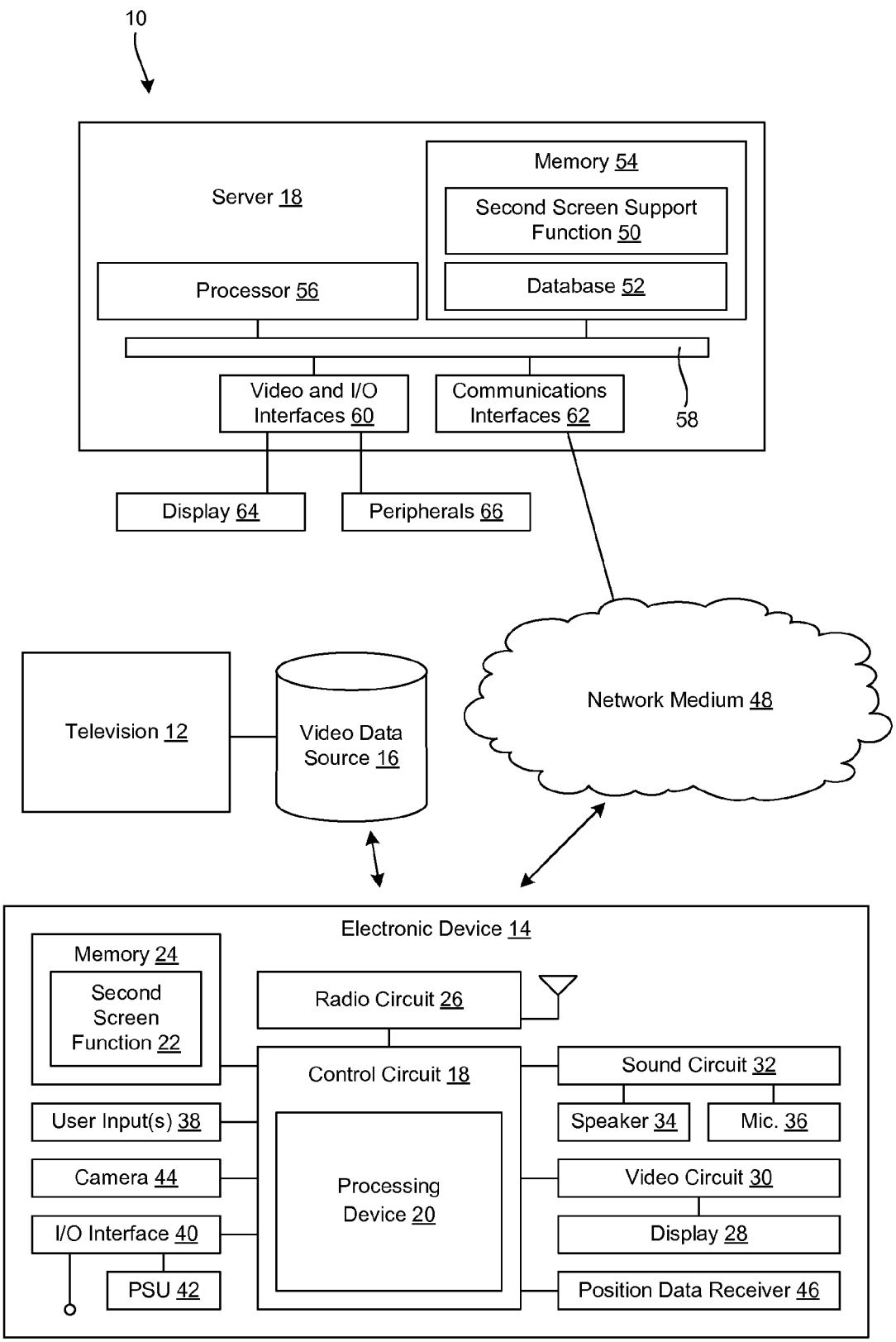
FIG. 1 is a schematic view of a system that generates and displays second screen content on an electronic device in coordination with video content displayed on another electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below in conjunction with the appended figures are various embodiments of a system and a method of generating content for a second screen experience using video subtitle data. As used herein, the term subtitle data refers to any type of textual information intended for display with associated video content regardless of the format of the textual information. For purposes of generating second screen content, the textual information need not be actually displayed during display of the video content. The subtitle data may be part of the video information for video content (e.g., part of the video file or video data) or may be contained in a separate file. Also, the term subtitle data includes data for close captioning. The subtitle data may be composed in advance of when the video content is displayed (e.g., for movies, prerecorded television shows, etc.) or close in time to when the video content is generated and displayed (e.g., for broadcasts of live sporting events, live television shows, etc.).

The video content is displayed to a user on a first electronic device. For purposes of an exemplary description, the first electronic device is a television. It will be understood that the video content may be displayed on or by another type of electronic device, such as a tablet computer, a laptop computer, a desktop computer, a projector system, or other appropriate device that is capable of displaying video and outputting associated sound.

The second screen content is displayed on a second electronic device. The second electronic device is typically (by not necessarily) a portable electronic device, and may take any form factor including, but not limited to, a tablet computer, a mobile telephone (e.g., a "smartphone"), a laptop computer, a desktop computer, a gaming device, a camera, a television, and a media player. The second electronic device in the following description is a mobile telephone, but applicability of the described techniques is not limited to mobile telephones. Also, in another embodiment, the second screen content is displayed on the display of the first electronic device. In this embodiment, the second electronic device is not present or is used to generate, but not display, the second screen content.

The generation of the second screen content may be generated by the second electronic device. In other embodiments, the second screen content is generated by another device (e.g., a television that plays video content and communicates with the second electronic device, a remote server that communicates with the second electronic device, a video data source that communicates with second electronic device, etc.). In some embodiments, some of the tasks to generate the second screen content are carried out by the second electronic device and other tasks to generate the second screen content are carried out by another device. In each of the embodiments, the second electronic device and/or another device executes appropriate logical instructions (e.g., in the form of executable code, also referred to as a program or software) with a respective processor. The logical instructions and any data stores containing information accessed by the logical instructions may be stored on a non-transitory computer readable medium (e.g., a memory in the form of one or more of a magnetic memory, an electronic memory, or an optical memory).

Referring to FIG. 1, schematically shown is a system 10 in which a user may watch television on a first electronic device (e.g., the exemplary television 12) and interact with second screen content with a second electronic device 14. In the illustrated embodiment, the second electronic device 14 is configured as a mobile phone but, as indicated, the second electronic device 14 may take other forms.

The video content played by the television 12 may be obtained from any appropriate video data source 16. Exemplary video data sources 16 include, but are not limited to, a transmission received with an appropriate transceiver or tuner (e.g., an over-the-air television broadcast, a cable TV transmission, a satellite TV transmission, or a TV transmission on land-line telephone wires), a recording stored on a storage medium and played back with an appropriate playback device (e.g., a DVD and DVD player, a digital video recorder (DVR), a mobile electronic device, etc.), or a video content service hosted by a server (e.g., the server supplying video content at the command of the user over the Internet, cable TV medium, satellite TV medium, etc.). For video content received via a transmission, the video content may be consumed live (e.g., at the time of transmission) or recorded and played back after the time of original transmission. Also, the user may have control over the time of playback (e.g., as with recorded video content or content obtained "on demand") or may not have control over the time of playback (e.g., as with live broadcasts or transmissions).

The video content that is obtained from the video data source 16 is associated with subtitle data. The subtitle data is available to the electronic device 14 (and/or is available to any other device involved in the generation of the second screen content, such as server 18). The subtitle data is available before or contemporaneously with the consumption of the video content by the television 12. To obtain the subtitle data, the electronic device 14 (and/or any other appropriate device that uses the subtitle data in the generation of second screen content) may communicate with the video data source 16. Communications between the video data source 16 and the electronic device 14 may be carried out using a wireless medium (e.g., a local area network such as a WiFi network), a cable, or over a broader network (e.g., a cellular network or the Internet).

The electronic device 14 includes a control circuit 18 that is responsible for overall operation of the electronic device 14. For this purpose, the control circuit 18 includes a processor 20 that executes various applications, such as a second screen function 22 that carries out tasks to generate and display second screen content to the user and enables user interaction with the second screen content as described in greater detail below. As indicated, the second screen function 22 may be implemented in the form of logical instructions that are executed by the processor 20.

The processor 20 of the control circuit 18 may be a central processing unit (CPU), microcontroller or microprocessor. The processor 20 executes code stored in a memory (not shown) within the control circuit 18 and/or in a separate memory, such as a memory 24, in order to carry out operation of the electronic device 14. The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 18. The memory 24 may exchange data with the control circuit 18 over a data bus. Accompanying control lines and an address bus between the memory 24 and the control circuit 18 also may be present. The memory 24 is considered a non-transitory computer readable medium.

The electronic device 14 includes communications circuitry that enables the electronic device 14 to establish various wireless communication connections. In the exemplary embodiment, the communications circuitry includes a radio circuit 26. The radio circuit 26 includes one or more radio frequency transceivers and an antenna assembly (or assemblies). The electronic device 14 may be capable of communicating using more than one standard. Therefore, the radio circuit 26 represents each radio transceiver and antenna needed for the various supported connection types. The radio circuit 26 further represents any radio transceivers and antennas used for local wireless communications directly with an electronic device, such as over a Bluetooth interface.

The electronic device 14 is configured to engage in wireless communications using the radio circuit 26, such as voice calls, data transfers, and the like. Data transfers may include, but are not limited to, receiving streaming content, receiving data feeds, downloading and/or uploading data (including Internet content), receiving or sending messages (e.g., chat-style messages, electronic mail messages, multimedia messages), and so forth.

Wireless communications may be through a subscriber network, which is typically a network deployed by a service provider with which the user of the electronic device 14 subscribes for phone and/or data service. Communications between the electronic device 14 and the subscriber network may take place over a cellular circuit-switched network connection. Exemplary interfaces for cellular circuit-switched network connections include, but are not limited to, global system for mobile communications (GSM), code division multiple access (CDMA), wideband CDMA (WCDMA), and advanced versions of these standards. Communications between the electronic device 14 and the subscriber network also may take place over a cellular packet-switched network connection that supports IP data communications. Exemplary interfaces for cellular packet-switched network connections include, but are not limited to, general packet radio service (GPRS) and 4G long-term evolution (LTE).

The cellular circuit-switched network connection and the cellular packet-switched network connection between the electronic device 14 and the subscriber network may be established by way of a transmission medium (not specifically illustrated) of the subscriber network. The transmission medium may be any appropriate device or assembly, but is typically an arrangement of communications base stations (e.g., cellular service towers, also referred to as "cell" towers). The subscriber network includes one or more servers for managing calls placed by and destined to the electronic device 14, transmitting data to and receiving data from the electronic device 14, and carrying out any other support functions. As will be appreciated, the server may be configured as a typical computer system used to carry out server functions and may include a processor configured to execute software containing logical instructions that embody the functions of the server and a memory to store such software and related data.

Another way for the electronic device 14 to access the Internet and conduct other wireless communications is by using a packet-switched data connection apart from the subscriber network. For example, the electronic device 14 may engage in IP communication by way of an IEEE 802.11 (commonly referred to as WiFi) access point (AP) that has connectivity to the Internet.

The electronic device 14 further includes a display 28 for displaying information to a user. The displayed information may include the second screen content. The display 28 may be coupled to the control circuit 18 by a video circuit 30 that converts video data to a video signal used to drive the display 28. The video circuit 30 may include any appropriate buffers, decoders, video data processors, and so forth.

The electronic device 14 may further include a sound circuit 32 for processing audio signals. Coupled to the sound circuit 32 are a speaker 34 and a microphone 36 that enable a user to listen and speak via the electronic device 14, and hear sounds generated in connection with other functions of the device 14. The sound circuit 32 may include any appropriate buffers, encoders, decoders, amplifiers and so forth.

The electronic device 14 also includes one or more user inputs 38 for receiving user input for controlling operation of the electronic device 14. Exemplary user inputs include, but are not limited to, a touch input that overlays the display 38 for touch screen functionality, one or more buttons, motion sensors (e.g., gyro sensors, accelerometers), and so forth.

The electronic device 14 may further include one or more input/output (I/O) interface(s) 40. The I/O interface(s) 40 may be in the form of typical electronic device I/O interfaces and may include one or more electrical connectors for operatively connecting the electronic device 14 to another device (e.g., a computer) or an accessory (e.g., a personal handsfree (PHF) device) via a cable. Further, operating power may be received over the I/O interface(s) 14 and power to charge a battery of a power supply unit (PSU) 42 within the electronic device 14 may be received over the I/O interface(s) 40. The PSU 42 may supply power to operate the electronic device 14 in the absence of an external power source.

The electronic device 14 also may include various other components. For instance, a camera 44 may be present for taking digital pictures and/or movies. Image and/or video files corresponding to the pictures and/or movies may be stored in the memory 24. As another example, a position data receiver 46, such as a global positioning system (GPS) receiver, may be present to assist in determining the location of the electronic device 14.

As mentioned, generation of second screen content may be performed in whole or in part by the server 18. The server 18 may be affiliated with the subscriber network or with a third party. Communications between the server 18 and the electronic device 14 may be through a network medium 48, which may include the Internet, the subscriber network, and/or other networks.

The server 18 may be implemented as a computer-based system that is capable of executing computer applications (e.g., software programs), including a second screen support function 50. The second screen support function 50, and an affiliated database 52, may be stored on a non-transitory computer readable medium, such as a memory 54. The memory 54 may be a magnetic, optical or electronic storage device (e.g., hard disk, optical disk, flash memory, etc.), and may comprise several devices, including volatile and non-volatile memory components. Accordingly, the memory 54 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices. To execute the second screen support function 50, the server 18 may include one or more processors 56 used to execute instructions that carry out a specified logic routine(s). The processor 56 and the components of the memory 54 may be coupled using a local interface 58. The local interface 58 may be, for example, a data bus with accompanying control bus, a network, or other subsystem.

The server 18 may have various video and input/output (I/O) interfaces 60 as well as one or more communications interfaces 62. The interfaces 60 may be used to operatively couple the server 18 to a display 64 and various peripherals 66 (e.g., a keyboard, a mouse, etc.). The communications interface 62 may include for example, a modem and/or a network interface card. The communications interface 62 may enable the server 18 to send and receive data signals, voice signals, video signals, and the like to and from other computing devices via an external network. In particular, the communications interface 62 may connect the server 18 to the network medium 48.

Figure 2:
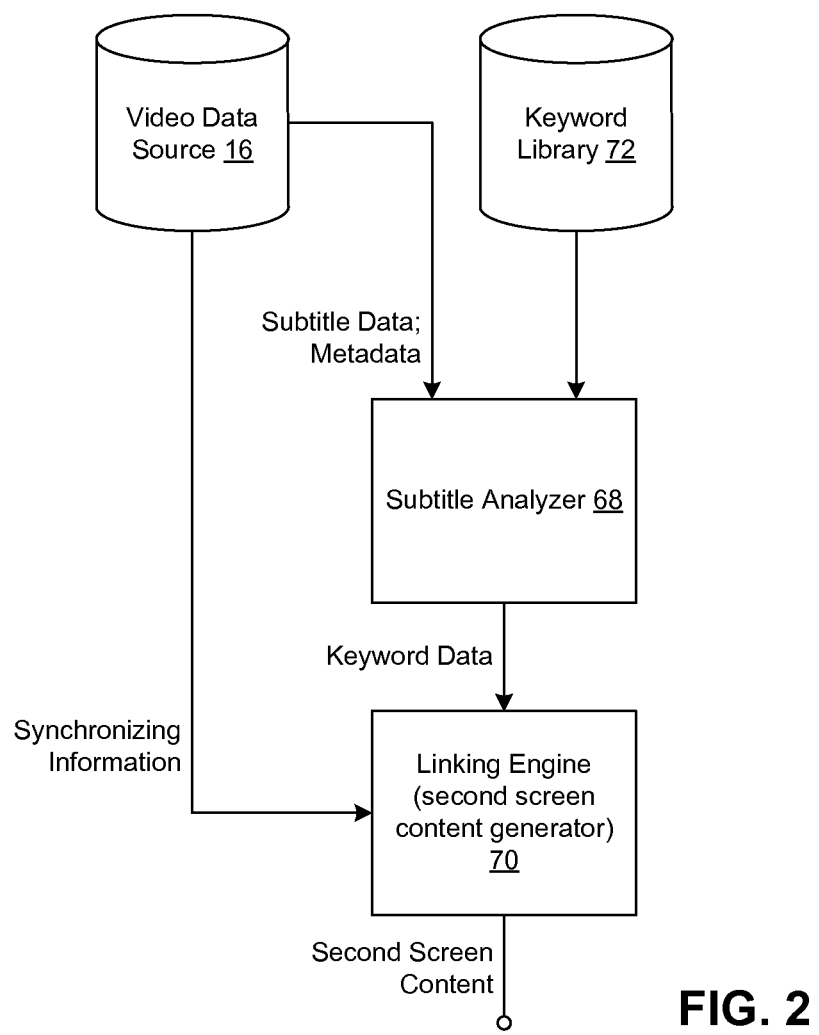
FIG. 2 is a schematic block diagram of modules of a second screen function that generates the second screen content.

With additional reference to FIG. 2, generation and user interaction with second screen content will be described. In the following description of the generation and user interaction with second screen content, no distinction is made as to which electronic platform (e.g., the electronic device 14 or the server 18) performs various tasks. It will be understood that each task may be carried out by an appropriate one of the electronic platforms, which communicates with any other appropriate electronic platform to access data or transmit processing results. Therefore, the described operations represent steps of a method that is carried out by the electronic device 12, the server 18, or another electronic device (e.g., the television 12 or the video data source 16), or partially carried by one of these devices and partially carried out by another one of the devices.

To carry out the described operations, the second screen function 22 or the second screen support function 50 may include a subtitle analysis module (also referred to as a subtitle analyzer 68) and a second screen content generator (also referred to as a linking engine 70). Additionally, the memory 24 or the memory 54 (as part of the database 52) may store a keyword library 72. If the electronic device 14 is responsible for generating the second screen content and the keyword library 72 is stored by the server 18, then the electronic device 14 will have access to the keyword library 72 over the network medium 48.

The keyword library 72 is populated with words that are predetermined to have relevancy for use in generating second screen content. The term "words" includes individual words and word groupings such as phrases, first and last name pairings, city and state, city and country, etc. The predetermined words in the keyword library 72 relate to topics such as, but not limited to, places (e.g., cities, landmarks, landmarks, geological features, etc.), people (e.g., politicians, celebrities, historical figures, famous fictional characters, athletes, etc.), things (e.g., famous documents, objects, ideological and scientific concepts, etc.), cultural references (e.g., literature, books, movies, performing arts, etc.), events (e.g., current news events, current events in the entertainment industry, sporting events, historical events, holidays, etc.). In one embodiment, the words populating the keyword library 72 may be tailored for one or more of the specific user, a demographic group, or a genre of the radio content (e.g., contain more sporting terms for a sports genre, contain more historical figures and historical events for an academic genre, or cultural references for a popular culture genre).

The textual information that makes up the subtitle data is input to the subtitle analyzer 68, which parses the subtitle data. If the subtitle data is available for the entire video content (e.g., when the subtitle data is contained in a file separate from the video content or extractable from the video content), the complete subtitle data may be parsed collectively. Otherwise, the subtitle data is parsed as the subtitle data is received or becomes available. In an alternative embodiment or when subtitle data is not available for video content, speech recognition may be applied to the audio component of the video content to produce a text version of the audio component and this text version is treated as the subtitle data that is parsed by the subtitle analyzer 68. There may be other instances where subtitle data is present, but the textual information is not directly interpretable by computer processes. An example of this situation is when the textual information is embedded as part of the video data and not as associated text data. In this case, optical character recognition (OCR) may be applied to the video content to produce a text version of the subtitle data and this text version is treated as the subtitle data that is parsed by the subtitle analyzer 68.

Parsing the subtitle data includes removing or ignoring words that are not likely to contribute to the generation of meaningful second screen content. The removed or ignored words may be common words in the language of the subtitle data. For instance a list of a predetermined number of the most common words (e.g., 200 words or 400 words) in the language may be established for use in eliminating words from consideration. In another embodiment, certain parts of speech may be eliminated from consideration, such as one or more of conjunctions, prepositions, interjections, adjectives, pronouns, and adverbs.

It is contemplated that the words remaining for consideration will be mainly nouns and verbs, such as persons (real and fictional, living and deceased), places, things, events, cultural references, and so forth. The subtitle analyzer 68 next determines if the remaining words for consideration are relevant for use in generating second screen content. In one embodiment, the subtitle analyzer 68 makes the relevancy determination for each word by comparing the word against words in the keyword library 72. More specifically, if the word under consideration from the subtitle data is present in the keyword library 72, then the word is retained for use in generating second screen content. Conversely, if the word under consideration from the subtitle data is not present in the keyword library 72, then the word is not used for the generation of second screen content. One exception may be that words occurring frequently in the subtitle data are retained for use in generating second screen content even through those words are not in the keyword library 72. For example, a word that is not in the keyword library 72, but occurs more than a predetermined number of times in the subtitle data (e.g., more than 25 times or more than 50 times) is retained.

The words that survive the relevancy determination are considered relevant words. The relevant words are ranked based on frequency, with the most frequently occurring words being ranked higher than less frequently occurring words. In one embodiment, the ranked list of relevant words are output to the linking engine 70 (FIG. 2) as keyword data.

In one embodiment, before the relevant words are output to the linking engine 70, the list of relevant words is further refined using metadata associated with the video content. The metadata may include, for example, a synopsis of the video content, credits that identify cast information (the actors that played various roles in the video content and the character names that each actor played) and crew information (the non-actors that worked on the video content), location settings for various scenes, etc.

It is contemplated that character names (also referred to as role names) will appear with frequency in the video content. Under one approach, it is thought that these names are not likely to contribute in a meaningful way to second screen content. Therefore, relevant words identified from the subtitle data that correspond to character names that appear in the metadata may be reduced in rank relative to less frequently occurring relevant words that do not appear in the metadata.

On the other hand, it is contemplated that the names of real persons, places, things, events, cultural references, etc. that appear in the metadata will likely contribute in a meaningful way to second screen content. Therefore, relevant words identified from the subtitle data that correspond to words in the metadata (other than character names) may be increased in rank relative to relevant words identified from the subtitle data that do not appear in the metadata.

The ranked list of relevant words, whether re-ranked according to metadata or not re-ranked according to metadata, are input to the linking engine 70 (FIG. 2) as keyword data. The linking engine 70 generates the second screen content from the keyword data and causes the second screen content to be displayed on the display 28 of the electronic device 14 at a time that is appropriate based on the video content. In other embodiments, the keyword data is not ranked according to frequency or correlation to metadata.

The words in the keyword data are used to identify links to various sources of media content related to the keyword data. In one embodiment, the links make up the second screen content and, in another embodiment, the second screen content is the media content that is accessed if the link is activated or selected. In one embodiment, the media content accessed by activating the links is available over the Internet (e.g., the links are links to Internet webpages from corresponding websites). The media content may be, but is not limited to, videos (e.g., from a video service, such as YOUTUBE), images (e.g., from an image service, such as FLICKR), audio content, informational web-pages (e.g., from an encyclopedic or information service, such as IMBD or WIKIPEDIA). Other exemplary media content includes content from travel guides, news websites, sports websites, "official" websites run by the subject of the related keyword, etc.

In one embodiment, the media content (and corresponding link(s)) for each word in the keyword data is identified by conducting an Internet search using the keyword data as the search criteria. The search results may be filtered to reduce the search results to webpages from recognized or predetermined services or websites.

In another embodiment, the media content for each word in the keyword data and that is also in the keyword library 72 is predetermined. For instance, for each keyword in the keyword library, one or more webpages may be previously determined and used by the linking engine as the second screen content for the corresponding word in the keyword data.

In one embodiment, the second screen content is generated for only a portion of the keyword data. For instance, the highest twenty percent of the keywords by the ranking in accordance with frequency or correlation to metadata are used to generate second screen content.

Once the second screen content is generated by the linking engine 70, the second screen content is output for display on the display 28 of the electronic device 14. If the second screen content is made up of links to media content, the links are displayed. The user, if interested in accessing the media content, may select the link to activate the link and display the associated media content on the display 28. If the second screen content is the media content, then the media content may be displayed directly (e.g., without first displaying and activating a link to the media content). Any audio component of the media content may be output via the speaker 34 or an operatively connected audio output device (e.g., earbuds or a PHF).

In one embodiment, character names appearing in the subtitle data and/or actors' real names are used in the generation of certain types of second screen content. For instance, this information may be used to identify actors or characters present in a scene of the video content. Once actors or characters in a scene are identified, the second screen content may be used to assist in controlling scene selection (e.g., the navigate to a scene with a particular actor or character) or displaying information about the actors or characters, such as biographic information about an actor appearing in a scene.

The second screen content is preferably output for display at an appropriate time relative to the progress of the display of the video content on the television 12. Most subtitle data contains synchronizing information to synchronize the display of textual information from the subtitle data with the display of the video content. The synchronizing information may be used by the linking engine 70 to control when items of second screen content are output for display. For example, the linking engine 70 may output second screen content for display when the words corresponding to the second screen content would ordinarily be displayed on the television 12 if the user had selected to display the textual information from the subtitle data. The second screen content may be displayed for a predetermined minimum amount of time to provide the user an opportunity to select, view, or interact with the second screen content. The predetermined minimum amount of time may be longer than the amount of time that the subtitle data would ordinarily be displayed on the television 12 since most subtitle text is displayed for only a brief period of time.

In one embodiment, if two or more items of second screen content are scheduled to be displayed contemporaneously based on the corresponding synchronizing information, then the number of items of second screen content may be reduced using the items' relative rankings. For example, the item or items with the lowest ranking may not be displayed.

In one embodiment, the second screen content is displayed without timed coordination with the display of the video content. In some cases, the second screen content may be displayed without display of the video content. For example, the generation of the second screen content may include an analysis to determine recommendations for other video content for the user, such as movies or shows that are similar to or have the same theme as the video content. This information, as well as other second screen content, need not be displayed in time coordination with the video content and may be displayed without display of the video content.

The above-described analysis of subtitle data may be expanded in some situations. For instance, rather than focusing on keywords, the analysis may focus on the type of conversation taking place in a scene of the video content, the mood of the conversation taking place in a scene of the video content, the lack of conversation in a scene of the video content, the type of music associated with a scene of the video content, etc. The results of this analysis may be used in a variety of ways. For example, the result may be used to set a graphical theme of the graphical user interface on the device 14. As another example, the result may be used to identify and find specific scenes in the video content. As another example, the result may be used to identify recommendations for other video content for the user.

The disclosed approach to generating and displaying second screen content uses subtitle data as a data source for creating an impressionable parallel experience for the user while watching video content.

The foregoing describes a way to generate second screen content for video content. Similar "second" content may be generated for other types of media. For example, lyrics from music content may be used to generate displayable content related to keywords from the lyrics using the techniques disclosed above.

Although certain embodiments have been shown and described, it is understood that equivalents and modifications falling within the scope of the appended claims will occur to others who are skilled in the art upon the reading and understanding of this specification.

What is claimed is:

1. A method of generating content for a display of an electronic device, the content coordinating with video content displayed on a display of another electronic device, comprising:
    analyzing subtitle data for the displayed video content for presence of predetermined keywords from a keyword library and, by way of the analyzing, identifying one or more of the predetermined keywords that are present in the subtitle data for the displayed video content;
    identifying links to media content, the media content relating to the one or more of the identified predetermined keywords that are present in the subtitle data for the displayed video content;
    outputting at least one of the links or the media content for display on the display of the electronic device as second screen content relative to the another electronic device; and
    controlling display of the second screen content in coordination with the display of the video content on the another electronic device, wherein the subtitle data contains synchronizing information and the controlling step including timing the step of outputting at least one of the links or media content for display to output the at least one of the links or the media content at times when corresponding keywords are scheduled for display according to the synchronizing information.

2. The method of claim 1, further comprising, prior to the analyzing step, eliminating words from the subtitle data that are at least one of common words or belonging to a predetermined part of speech and the analyzing step carried out on the subtitle data without the eliminated words.

3. The method of claim 1, further comprising, prior to the identifying links step, ranking the identified keywords by frequency of occurrence in the subtitle data and the identifying links step is carried out only on a highest ranked portion of the identified keywords.

4. The method of claim 3, further comprising increasing the rank of an identified keyword that matches a word in metadata for the video content.

5. The method of claim 1, wherein the link for at least one of the identified keywords is predetermined.

6. The method of claim 1, wherein the link for at least one of the identified keywords is identified by conducting an Internet search using the at least one of the identified keywords.

7. The method of claim 1, wherein the identified keywords further include words that appear in the subtitle data more than a predetermined number of times.

8. The method of claim 1, wherein the analyzing step further comprises retaining words occurring more than a predetermined number of times in the subtitle data but not in the keyword library and the identifying links step further comprises identifying links to additional media content relating to the retained words, and including the links or additional media content corresponding to the retained words in the outputting and controlling steps.

9. A system for generating content for a display of an electronic device, the content coordinating with video content displayed on a display of another electronic device, comprising:
    a communication interface operatively connected to receive subtitle data for the displayed video content from a video data source;
    a processing device that executes logical instructions to:
        analyze subtitle data for the displayed video content for presence of predetermined keywords from a keyword library and, by way of the analysis, identify one or more of the predetermined keywords that are present in the subtitle data for the displayed video content;
        identify links to media content, the media content relating to the one or more of the identified predetermined keywords that are present in the subtitle data for the displayed video content;
        output at least one of the links or the media content for display on the display of the electronic device as second screen content relative to the another electronic device; and
        control display of the second screen content in coordination with the display of the video content on the another electronic device, wherein the subtitle data contains synchronizing information and the control includes timing the output to output the at least one of the links or the media content at times when corresponding keywords are scheduled for display according to the synchronizing information.

10. The system of claim 9, wherein, prior to the analysis, the processing device executes logical instructions to eliminate words from the subtitle data that are at least one of common words or belonging to a predetermined part of speech and the analysis carried out on the subtitle data without the eliminated words.

11. The system of claim 9, wherein, prior to the identification of links, the processing device executes logical instructions to rank the identified keywords by frequency of occurrence in the subtitle data and the identification of links is carried out only on a highest ranked portion of the identified keywords.

12. The system of claim 11, wherein the rank of an identified keyword that matches a word in metadata for the video content is increased.

13. The system of claim 9, wherein the link for at least one of the identified keywords is predetermined.

14. The system of claim 9, wherein the link for at least one of the identified keywords is identified by conducting an Internet search using the at least one of the identified keywords.

15. The system of claim 9, wherein the identified keywords further include words that appear in the subtitle data more than a predetermined number of times.

16. The system of claim 9, the analysis includes retaining words occurring more than a predetermined number of times in the subtitle data but not in the keyword library and the identification of links further includes identifying links to additional media content relating to the retained words, and including the links or additional media content corresponding to the retained words in the output in accordance with the control of the display of the second screen content.

17. A method of generating content for a display of an electronic device, the content coordinating with video content displayed on a display of another electronic device, comprising:
    analyzing subtitle data for the displayed video content, including parsing the subtitle data to eliminate for words that are at least one of common words or words belonging to a predetermined part of speech, at least some of the remaining words from the subtitle data being keywords;
    identifying links to media content, the media content relating to the one or more of the keywords that are present in the subtitle data for the displayed video content;

outputting at least one of the links or the media content for display on the display of the electronic device as second screen content relative to the another electronic device; and controlling display of the second screen content in coordination with the display of the video content on the another electronic device, wherein the subtitle data contains synchronizing information and the controlling step including timing the outputting step to output the at least one of the links or the media content at times when corresponding keywords are scheduled for display according to the synchronizing information.

18. The method of claim 17, wherein the analyzing further includes, for the words remaining after parsing, determining a frequency of occurrence of the words in the subtitle data and the keywords are words appearing in the subtitle data more than a predetermined number of times.

\* \* \* \* \*